Feb. 18, 1941.  B. HOLLAND  2,232,457
CLUTCH AND BRAKE MECHANISM FOR HOISTING APPARATUS
Filed May 23, 1938
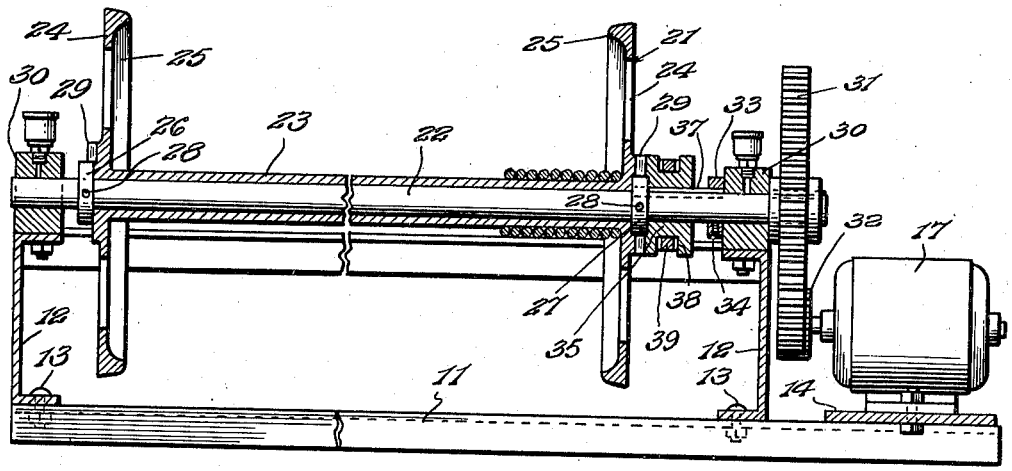
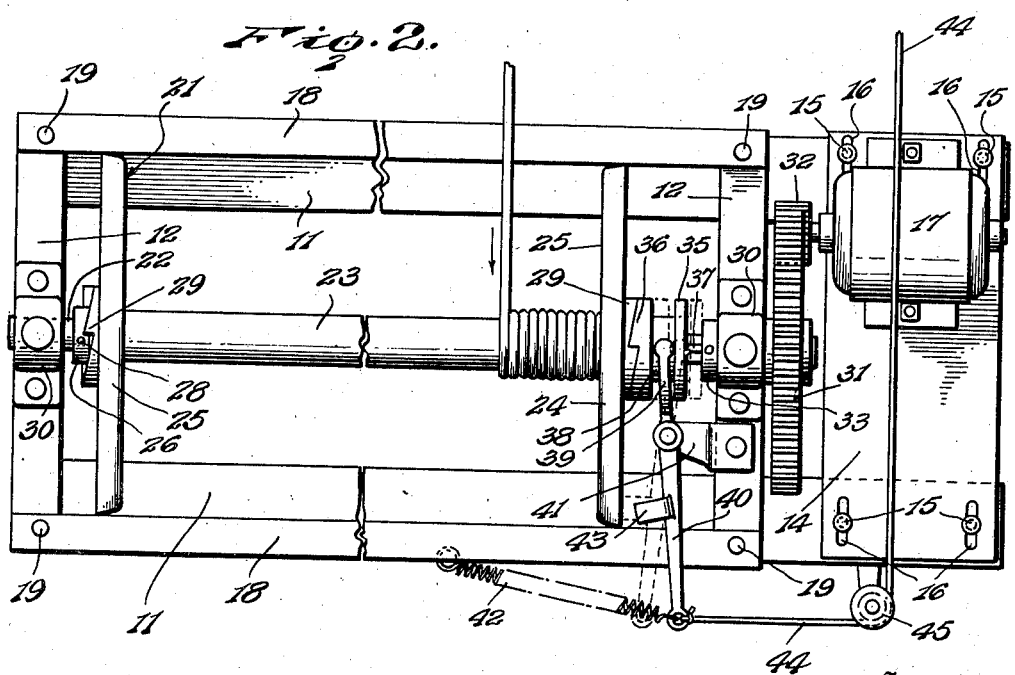
Inventor
Bert Holland.
By Lacey & Lacey
Attorneys Patented Feb. 18, 1941

2,232,457

UNITED STATES PATENT OFFICE 2,232,457

CLUTCH AND BRAKE MECHANISM FOR HOISTING APPARATUS

Bert Holland, Ontario, Ohio

Application May 23, 1938, Serial No. 209,500

1 Claim. (Cl. 192—18)

This invention relates to improved clutch and brake mechanism which is more particularly adapted for use with hoisting apparatus of the type commonly employed for raising hay or the like from a farm wagon for deposit within a hay loft.

The invention has for one of its principal objects to provide clutch and brake mechanism having an operating lever which is yieldably held in position to hold the clutch released and carries a brake engageable with a head of the drum employed for checking rotation thereof when a load of hay is dropped from the fork and the clutch moved to the releasing position.

In the drawing:

Figure 1 is a longitudinal sectional view of the improved clutch and brake mechanism and showing it applied to a hoist, and Figure 2 is a top plan view of said mechanism.

The frame of the hoist on which my invention is mounted is formed of strong metal and has longitudinally extending base bars 11 formed of channel metal, as shown in Figure 4, and extending longitudinally of the frame at opposite sides thereof. These base bars support upright cross bars 12 which are also formed of channel metal and have their upper and lower flanges facing inwardly, as shown in Figure 1, the lower flanges of the cross bars being secured to the base bars 11 by bolts or other suitable fasteners 13. One of the cross bars 12 is disposed at ends of the base bars but the other cross bar is spaced from ends of the base bars in order to provide the base bars with end portions which project from this cross bar a sufficient distance to provide supporting means for a platform 14 which is formed from a strong metal plate and removably secured by fasteners 15 which pass through slots 16 formed longitudinally of the metal plate. This metal plate or platform carries the motor 17 and since the fasteners 15 pass through the longitudinally extending slots 16, the platform or metal plate may be shifted transversely of the frame and the fasteners 15 then tightened to hold it in a set position. Upper side bars 18 which are formed of angle metal extend longitudinally of the frame between the cross bars 12 and at their ends are secured to the cross bars by bolts or other suitable fasteners 19. It will thus be seen that the frame will be of a strong and rigid construction.

The drum 21 upon which the rope or cable 6 is wound is carried by a shaft 22 and has an elongated tubular sleeve 23 through which the shaft passes and heads or disks 24 at ends of the sleeve. These heads or disks 24 are formed with inwardly projecting marginal lips or flanges 25, and upon referring to Figure 1, it will be seen that these lips or flanges will tend to overlap rope which has been wound about the sleeve 23. Therefore, when the rope has been wound about the sleeve from one end to the other, the rope which is moving toward the drum will engage the flounce or lip of the adjacent head or disk and will be deflected towards the other end of the drum. Therefore, the rope will be evenly wound upon the drum and be deflected towards the other end of the drum each time the winding reaches an end of the drum and the rope will not pile up at an end of the drum. While the drum fits loosely about the shaft 22, it must be prevented from shifting longitudinally of the shaft. Therefore, there has been provided collars 26 and 27 which fit about the shaft and engage the drum at opposite ends thereof. By properly positioning the collars upon the shaft and then securing them by set screws 28 the collars will be firmly held at such a distance from each other that the drum will be prevented from shifting longitudinally of the shaft but at the same time permit it to rotate freely about the shaft. Circumferentially extending clutch teeth 29 are formed at opposite ends of the drum and fit about the collars. While only the clutch teeth at one end of the drum are made use of, teeth have been formed at both ends of the drum so that special care need not be taken when applying the drum to the shaft and also permit the shaft to be reversed in case the teeth of the clutch member in use should become broken.

The shaft 22 is rotatably mounted through bearings 30 bolted or otherwise firmly secured upon the upper flanges of the cross bars 12 and one end portion of the shaft projects from its bearing and carries a large gear 31 for meshing with the small gear or pinion 32 carried by the shaft of the motor 17. By having the plate or platform 14 secured by fasteners passing through the slot 16, the platform may be shifted transversely of the frame and thus move the pinion or small gear 32 into or out of position to mesh with the large gear 31 carried by the shaft 32. A collar 33 which fits about said shaft and is secured by a set screw 34 in position to engage the inner side face of the adjacent bearing 30 cooperates with the gear 31 to prevent the shaft from shifting longitudinally through the bearing and, therefore, the gear 31 will be maintained in meshing engagement with the gear or pinion 32. Between the collar 27 and the collar 34 there has been provided a shiftable clutch member 35 which is formed of strong metal and at its inner end is formed with clutch teeth 36 for interlocking engagement with the clutch teeth 29 of the drum. A key 37 which extends longitudinally of the shaft 22 is seated in a groove formed longitudinally in the shaft and this key projects radially from the shaft and is engaged in grooves formed in the clutch 35 and the collars 28 and 33. Therefore, the shiftable clutch may be moved longitudinally of the shaft into and out of position for its teeth to engage the clutch teeth of the drum but the shiftable clutch member and the two collars 27 and 33 will be firmly held against rotary movement relative to the shaft and the shiftable clutch member will at all times turn with the shaft. When the shiftable clutch member is in engagement with the clutch teeth of the drum, the drum will be turned with the shaft to wind the cable upon the drum, but when the shiftable clutch member is out of engagement with the teeth of the drum, the drum will be freed from the shaft and may be rotated about the shaft in a direction to permit unwinding of the cable. A groove 38 is formed circumferentially about the shiftable clutch member and in this groove are engaged the arms of the fork 39 formed at the inner end of the clutch operating lever 40. This clutch operating lever is pivoted to a bracket 41 carried by and extending inwardly from the upper end of the adjacent cross bar 12 and the free end of the lever projects from the frame and is engaged by a spring 42 which serves to yieldably hold the lever in a normal position in which the shiftable clutch member will be held out of engagement with the clutch teeth of the drum. When the clutch lever is moved to the position shown in Figure 2 wherein the shiftable clutch member is in engagement with the teeth of the drum, the weight of a forkload of hay will cause the shiftable clutch member to be frictionally held in its clutching position, but when the fork load of hay is dropped, friction will no longer hold the teeth of the shiftable clutch member in engagement with the teeth of the drum and the spring will then act upon the lever and cause the shiftable clutch member to be moved to its releasing position. A side arm or brake member 43 projecting from one side of the lever will be moved into engagement with the adjacent disk or head of the drum and the drum will be brought to a stop. While the brake member will cause the drum to be brought to a stop after a load has been dropped, its braking action will not, however, be sufficient to prevent the cable from being unwound when pull is exerted upon this cable by the operator. The actuating line 44 for the lever 40 is engaged with a pulley 45 and then extended longitudinally of the track 9 and engaged with a guide pulley 46 from which the free end portion of the line extends downwardly into position to be grasped by a person standing upon a hay wagon.

In use, the clutch lever is actuated for shifting the clutch member 35 along the shaft 22 into position to engage the clutch teeth of the drum, with the result that the drum will be caused to rotate with the shaft in a direction to wind the cable about the drum. When the cable has been wound sufficiently upon the drum, the clutch lever 40 is again shifted for freeing the teeth of the clutch member from the teeth of the drum. The drum will then be capable of free movement about the shaft. When the lever is shifted further, the brake member will engage the end face of the drum head for retaining said drum head in a desired set position.

Having thus described the invention, what is claimed as new is:

In a hoisting device of the character described, a frame, a rotary shaft carried by said frame, a rotatable drum carried by said shaft and having clutch teeth, a clutch member carried by said shaft and shiftable along the shaft into and out of clutching engagement with the clutch teeth of said drum, a substantially straight operating lever for the shiftable clutch member, a bracket pivotally mounting the lever, a spring tensioned between the outer end of the lever and the frame and yieldably holding said lever in its normal position with the shiftable clutch member disengaged from the clutch member of said drum, and a brake carried by the operating lever and extending laterally from substantially the midportion thereof and engageable with a portion of the outer face of one end of the drum checking rotation of said drum when the lever is in its normal position.

BERT HOLLAND.